(12) United States Patent
Wang et al.

(10) Patent No.: US 11,983,624 B2
(45) Date of Patent: May 14, 2024

(54) AUTO GENERATION AND TUNING TOOL FOR CONVOLUTION KERNELS

(71) Applicant: Advanced Micro Devices, Inc., Santa Clara, CA (US)

(72) Inventors: Fei Wang, Jinan (CN); Jian Yang, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 897 days.

(21) Appl. No.: 16/367,093

(22) Filed: Mar. 27, 2019

(65) Prior Publication Data

US 2020/0302285 A1    Sep. 24, 2020

(30) Foreign Application Priority Data

Mar. 18, 2019    (CN) .......................... 201910201492.3

(51) Int. Cl.
  *G06T 5/50*    (2006.01)
  *G06N 3/08*    (2023.01)
  (Continued)

(52) U.S. Cl.
  CPC ............... *G06N 3/08* (2013.01); *G06N 20/10* (2019.01); *G06T 5/20* (2013.01); *G06T 5/50* (2013.01); *G06T 2207/20084* (2013.01)

(58) Field of Classification Search
  CPC ... G06T 5/20; G06T 5/50; G06T 2207/20084; G06N 20/10; G06N 3/0454; G06N 3/08
  See application file for complete search history.

(56) References Cited

U.S. PATENT DOCUMENTS

| 4,873,630 A | 10/1989 | Rusterholz et al. |
| 5,657,420 A | 8/1997 | Jacobs et al. |

(Continued)

FOREIGN PATENT DOCUMENTS

| EP | 3098762 A1 | 11/2016 |
| JP | 2014203135 A | 10/2014 |

(Continued)

OTHER PUBLICATIONS

Non-Final Office Action in U.S. Appl. No. 16/117,302, dated Jan. 12, 2022, 66 pages.

(Continued)

*Primary Examiner* — Syed Haider
(74) *Attorney, Agent, or Firm* — Kowert, Hood, Munyon, Rankin & Goetzel, P.C.; Rory D. Rankin (57) ABSTRACT

Systems, apparatuses, and methods for implementing an auto generation and tuning tool for convolution kernels are disclosed. A processor executes multiple tuning runs of a given layer of a neural network while using a different set of operating parameter values for each tuning run. The operating parameters can include one or more of input dataset fetch group size, output channel group size, and other parameters. The processor captures performance data for each tuning run and then after all tuning runs have finished, the processor determines which set of operating parameter values resulted in a better performance for the given neural network layer. The processor uses these operating parameter values for subsequent iterations of the given layer. The processor also performs the same techniques for other layers to determine which set of operating parameter values to use for each layer so as to maximize performance of the neural network.

20 Claims, 9 Drawing Sheets

(51) Int. Cl.
  *G06N 20/10*   (2019.01)
  *G06T 5/20*   (2006.01)

(56) References Cited

U.S. PATENT DOCUMENTS

| | | | |
|---|---|---|---|
| 6,067,287 | A | 5/2000 | Chung-Ju et al. |
| 8,131,660 | B2 | 3/2012 | Davis et al. |
| 8,369,595 | B1 | 2/2013 | Derakhshani et al. |
| 9,319,137 | B2 | 4/2016 | Zhuge et al. |
| 9,430,735 | B1 | 8/2016 | Vali et al. |
| 10,078,794 | B2 | 9/2018 | Pierce et al. |
| 10,740,674 | B2 | 8/2020 | Ambrose et al. |
| 10,776,684 | B1 | 9/2020 | Agarwal et al. |
| 2002/0152441 | A1 | 10/2002 | Senda et al. |
| 2006/0031652 | A1 | 2/2006 | Richter et al. |
| 2007/0030926 | A1 | 2/2007 | Brown et al. |
| 2011/0078342 | A1 | 3/2011 | Siddabathuni et al. |
| 2011/0296212 | A1 | 12/2011 | Elnozahy et al. |
| 2015/0178246 | A1 | 6/2015 | Herrero Abellanas et al. |
| 2015/0242322 | A1 | 8/2015 | Vajapeyam |
| 2015/0358755 | A1 | 12/2015 | Luo et al. |
| 2016/0062294 | A1 | 3/2016 | Murashima |
| 2016/0179434 | A1 | 6/2016 | Herrero Abellanas et al. |
| 2016/0259994 | A1* | 9/2016 | Ravindran ............ G06K 9/6274 |
| 2016/0350645 | A1 | 12/2016 | Brothers et al. |
| 2016/0379109 | A1 | 12/2016 | Chung et al. |
| 2017/0124451 | A1 | 5/2017 | Barham et al. |
| 2017/0286864 | A1 | 10/2017 | Fiedel et al. |
| 2017/0316312 | A1 | 11/2017 | Goyal et al. |
| 2017/0344882 | A1 | 11/2017 | Ambrose et al. |
| 2018/0032859 | A1 | 2/2018 | Park et al. |
| 2018/0032867 | A1* | 2/2018 | Son ......................... G06N 3/082 |
| 2018/0046900 | A1 | 2/2018 | Dally et al. |
| 2018/0082212 | A1* | 3/2018 | Faivishevsky ......... G06N 5/003 |
| 2018/0089087 | A1 | 3/2018 | Chang et al. |
| 2018/0096226 | A1 | 4/2018 | Aliabadi et al. |
| 2018/0114114 | A1* | 4/2018 | Molchanov ............ G06N 3/045 |
| 2018/0174036 | A1 | 6/2018 | Han et al. |
| 2018/0189641 | A1 | 7/2018 | Boesch et al. |
| 2018/0218303 | A1 | 8/2018 | Cole et al. |
| 2018/0262291 | A1 | 9/2018 | Doster et al. |
| 2018/0365558 | A1* | 12/2018 | Sekiyama ................ G06N 3/08 |
| 2019/0026237 | A1 | 1/2019 | Talpes et al. |
| 2019/0028752 | A1 | 1/2019 | Zhang et al. |
| 2019/0205745 | A1 | 7/2019 | Sridharan et al. |
| 2019/0220734 | A1* | 7/2019 | Ferdman ................ G06F 17/15 |
| 2019/0266015 | A1 | 8/2019 | Chandra et al. |
| 2019/0324755 | A1 | 10/2019 | Herr et al. |
| 2019/0324759 | A1 | 10/2019 | Yang et al. |
| 2019/0325296 | A1 | 10/2019 | Fowers et al. |
| 2020/0151558 | A1* | 5/2020 | Ren ......................... G06N 3/045 |
| 2020/0258223 | A1 | 8/2020 | Yip et al. |

FOREIGN PATENT DOCUMENTS

| | | | |
|---|---|---|---|
| JP | 2016033806 | A | 3/2016 |
| JP | 2017151604 | A | 8/2017 |
| WO | 2017003887 | A1 | 1/2017 |

OTHER PUBLICATIONS

Lin et al., "Deep Gradient Compression: Reducing the Communication Bandwidth for Distributed Training", ICLR 2018 Conference, Dec. 5, 2017, 13 pages.

Non-Final Office Action in U.S. Appl. No. 17/006,533, dated Jan. 27, 2022, 12 pages.

First Examination Report in Indian Patent Application No. 202017020013, dated Mar. 28, 2022, 7 pages.

Non-Final Office Action in U.S. Appl. No. 15/812,336, dated Oct. 14, 2020, 20 pages.

Notice of Allowance in U.S. Appl. No. 16/234,956, dated May 5, 2020, 10 pages.

Final Office Action in U.S. Appl. No. 15/657,613, dated Mar. 8, 2019, 10 pages.

International Search Report and Written Opinion in International Application No. PCT/US2018/052358, dated Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation & Test in Europe, Mar. 14, 2016, pp. 1393-1398.

Non-Final Office Action in U.S. Appl. No. 15/657,613, dated Oct. 5, 2018, 12 pages.

Lagudu et al., U.S. Appl. No. 15/812,336, entitled "Memory Bandwidth Reduction Techniques for Low Power Convolutional Neural Network Inference Applications", filed Nov. 14, 2017, 41 pages.

Zhang et al., U.S. Appl. No. 16/117,302, entitled "Machine Learning Inference Engine Scalability", filed Aug. 30, 2018, 32 pages.

Lagudu et al., U.S. Appl. No. 16/177,218, entitled "Low Latency Long Short-Term Memory Inference with Sequence Interleaving", filed Oct. 31, 2018, 28 pages.

Zhang et al., U.S. Appl. No. 16/234,956, entitled "Tiling Format for Convolutional Neural Networks", filed Dec. 28, 2018, 42 pages.

Non-Final Office Action in U.S. Appl. No. 16/177,218, dated May 23, 2022, 16 pages.

Notice of Allowance in U.S. Appl. No. 17/006,533, dated Jul. 5, 2022, 8 pages.

Non-Final Office Action in Japanese Patent Application No. 2020-544323, dated Aug. 23, 2022, 9 pages.

Final Office Action in U.S. Appl. No. 16/117,302, dated Sep. 14, 2022, 74 pages.

Li et al., "A High Performance FPGA-Based Accelerator for Large-Scale Convolutional Neural Networks" 2016 26th International Conference on Field Programmable Logic and Applications (FPL), 2016, 9 pages.

Advisory Action in U.S. Appl. No. 16/117,302, dated Feb. 28, 2023, 4 pages.

Non-Final Office Action in U.S. Appl. No. 18/050,939, dated Mar. 29, 2023, 13 pages.

* cited by examiner

AUTO GENERATION AND TUNING TOOL FOR CONVOLUTION KERNELS

PRIORITY INFORMATION

This application claims benefit of priority to Chinese Application No. 201910201492.3, entitled "AUTO GENERATION AND TUNING TOOL FOR CONVOLUTION KERNELS", filed Mar. 18, 2019, the entirety of which is incorporated herein by reference in its entirety.

BACKGROUND

Description of the Related Art

A graphics processing unit (GPU) is a complex integrated circuit that performs graphics-processing tasks. For example, a GPU executes graphics-processing tasks required by an end-user application, such as a video-game application. GPUs are also increasingly being used to perform other tasks which are unrelated to graphics. In some implementations, the GPU is a discrete device or is included in the same device as another processor, such as a central processing unit (CPU).

In many applications, such as graphics processing applications executed by a GPU, a sequence of work-items, which can also be referred to as threads, are processed so as to output a final result. In one implementation, each processing element executes a respective instantiation of a particular work-item to process incoming data. A work-item is one of a collection of parallel executions of a kernel invoked on a compute unit. A work-item is distinguished from other executions within the collection by a global ID and a local ID. As used herein, the term "compute unit" is defined as a collection of processing elements (e.g., single-instruction, multiple-data (SIMD) units) that perform synchronous execution of a plurality of work-items. The number of processing elements per compute unit can vary from implementation to implementation. A subset of work-items in a workgroup that execute simultaneously together on a compute unit can be referred to as a wavefront, warp, or vector. The width of a wavefront is a characteristic of the hardware of the compute unit. As used herein, a collection of wavefronts are referred to as a "workgroup". Also, a "wavefront" can also be referred to herein as a "wave".

An emerging technology field is machine learning, with a neural network being one type of a machine learning model. Implementing neural networks on GPUs or other parallel processing units (e.g., digital signal processors (DSPs), field programmable gate arrays (FPGAs), application specific integrated circuits (ASICs)) involves loading and processing large amounts of data. A convolutional neural network typically includes many layers such as convolution layers, pooling layers, normalization layers, and so on. A convolution layer uses a convolution kernel to filter an input dataset (e.g., an image). A kernel is typically a small matrix, and a kernel can also be referred to as a convolution matrix. The kernel is used for blurring, sharpening, embossing, edge detection, and more. The convolution layer performs a convolution between a kernel and an image.

Neural networks are used in a wide variety of applications (e.g., hand-written digit classification, face detection). Neural networks have demonstrated excellent performance at tasks such as hand-written digit classification and face detection. Additionally, neural networks have also shown promise for performing well in other, more challenging, visual classification tasks. Other applications for neural networks include speech recognition, language modeling, sentiment analysis, text prediction, and others. However, neural networks often use significant amounts of processing and memory resources.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for utilizing a tuning tool to automatically generate convolution kernels are disclosed herein. A system includes at least a processor and a memory storing input datasets and weights for various layers of a neural network. The system determines which operating parameters to use for each layer of the neural network to optimize the performance of the system when executing the neural network. In one implementation, the system tries multiple sets of operating parameters for each layer during multiple tuning runs. Each tuning run uses a different set of operating parameters. The system captures performance data during each tuning run, and after performing multiple tuning runs for a given layer of the neural network, the system determines which tuning run resulted in a better (i.e., improved) performance of the system as compared to the performance for other tuning runs. In some implementations, the tuning run resulting in the best performance of the tuning runs is determined. The system identifies and stores the set of operating parameters from the tuning run that resulted in a better performance of the system. Then, the system uses this set of operating parameters for subsequent iterations of the given layer. Also, the system repeats this technique for each layer of the neural network to find a better operating parameters for all of the layers of the entire neural network. Accordingly, the system can change the operating parameters when moving from one layer to the next during an actual implementation of the neural network.

Figure 1:
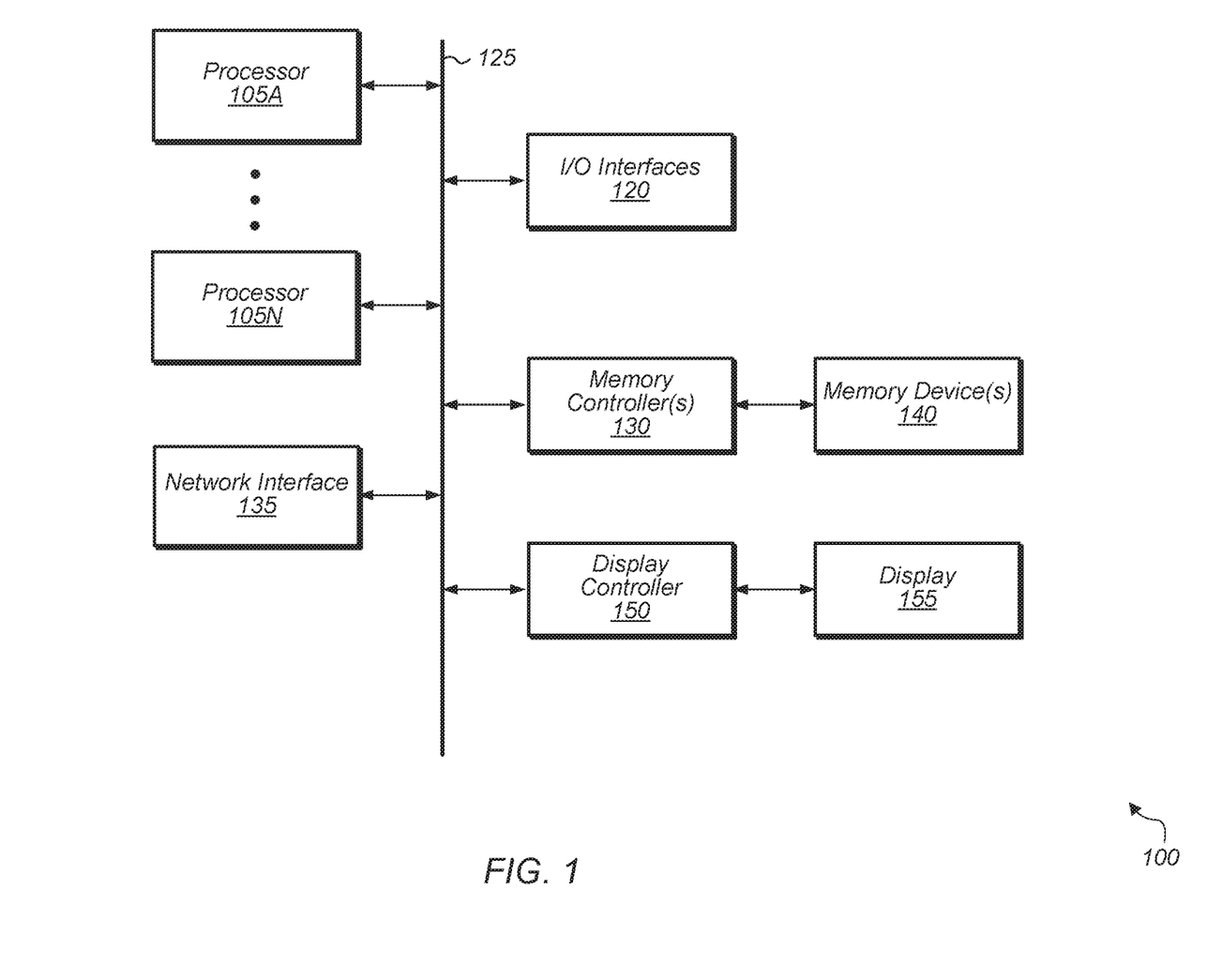
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components, omits one or more of the illustrated components, and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
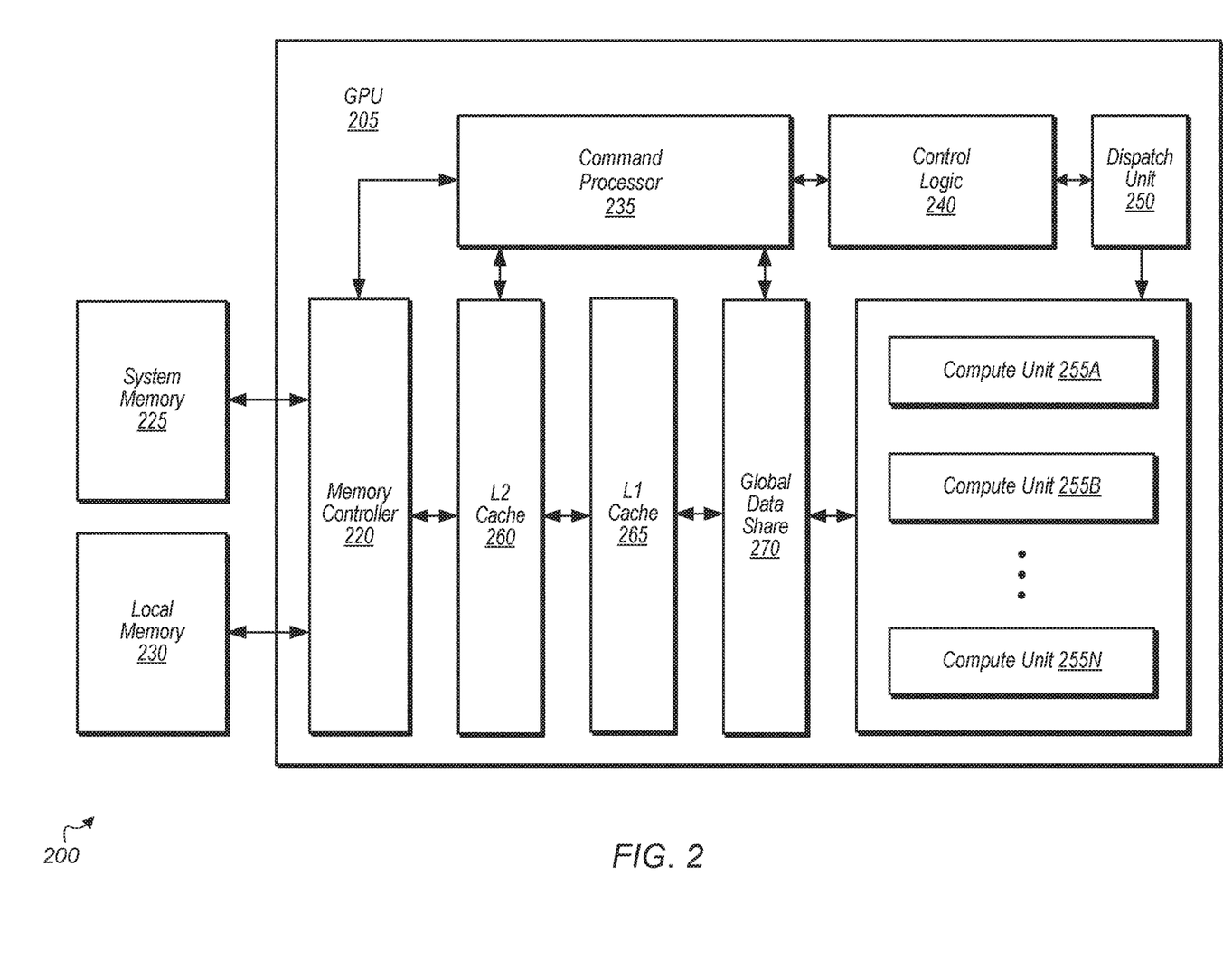
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to issue corresponding wavefronts to compute units 255A-N. In one implementation, each compute unit 255A-N includes a matrix operations unit. For example, in one implementation, the matrix operations unit performs matrix multiplication operations to implement a convolutional layer of a neural network. Additionally, in various implementations, the matrix operations unit performs other types of matrix operations. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

In one implementation, computing system 200 implements a tuning run of one or more layers of the neural network on compute units 255A-N. During each tuning run, for each layer, a different set of operating parameters are used while performance data is captured. For example, in one implementation, for the convolution layer, the operating parameters include an amount of data that is fetched from global memory and/or cache at a time in each fetch and the number of output channels that are calculated in one loop. In the pooling layer, other operating parameters (e.g., work group size) are included in the set of operating parameters that are adjusted for each tuning run.

For example, for a convolution layer with 64 output channels, in a first tuning run, a program is generated where 2 output channels are calculated for each loop for a total of 32 loops. In a second tuning run, a program is generated where 4 output channels are calculated in one loop, and the program will loop for 16 times. Any number of other programs are executed with other numbers of output channels calculated per loop. Also, the number of input dataset elements that are fetched per fetch can also vary in each program that is generated in each tuning run. For example, each fetch loads 256 input dataset elements in the first program, each fetch loads 512 input dataset elements in the second program, and so on. Additionally, in one implementation, the number of filter weights that are fetched per fetch is also varied per program. Other parameters can also be varied in the different programs, and the number of programs that are executed can be sufficiently large to try various different combinations of parameter values.

Performance data is captured for each program, and the program with a better performance is determined based on the captured performance data. In one implementation, the execution time is measured for each program, and the program with the shortest execution time is deemed to have a better performance. In other implementations, other performance data is captured. For example, power consumption, memory usage, memory bandwidth usage, register usage, and/or other performance metrics are captured. Then, after the preferred operating parameters are determined for a first layer, the process is repeated for the second layer. For the second layer, the operating parameters can be different depending on the type of layer (e.g., pooling, normalization, convolution). Eventually, all of the layers of the neural network will be processed in this manner.

Figure 3:
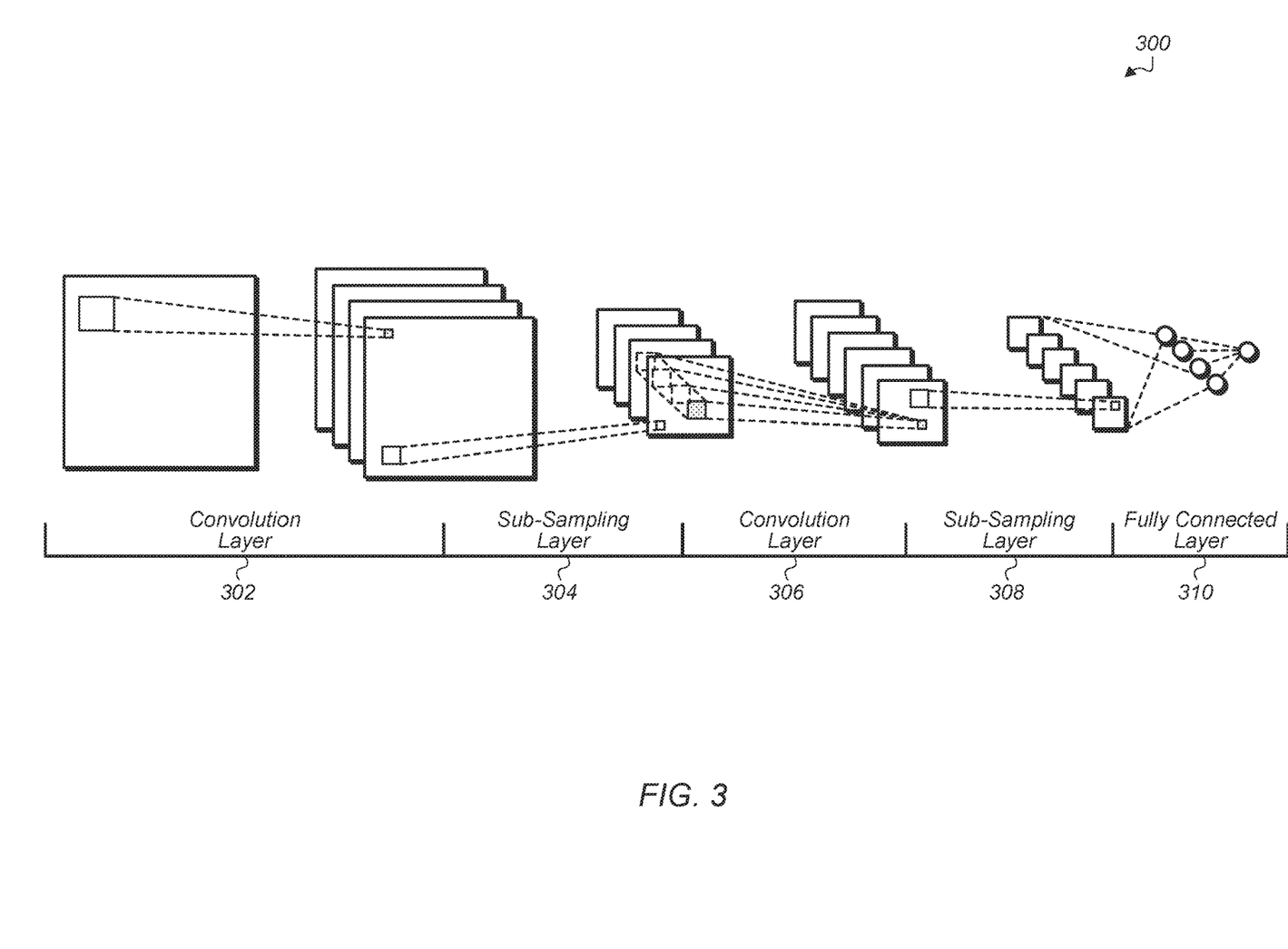
FIG. 3 is a block diagram of one implementation of a neural network.

Turning now to FIG. 3, a block diagram of one implementation of a neural network 300 is shown. Neural network 300 includes convolution layer 302, sub-sampling layer 304, convolution layer 306, sub-sampling layer 308, and fully connected layer 310. In other embodiments, neural network 300 can include other numbers and arrangements of layers. When implementing neural network 300 on a computing system (e.g., system 100 of FIG. 1, system 200 of FIG. 2), the performance of the system can vary widely depending on the particular program parameters that are chosen for each layer. Accordingly, in one implementation, the system executes multiple programs (i.e., tuning runs) to determine the preferred operating parameters to use for each layer of neural network 300 so as to optimize performance. Then, during subsequent iterations of the neural network 300, the system uses the preferred parameters to optimize the performance of each layer.

Figure 4:
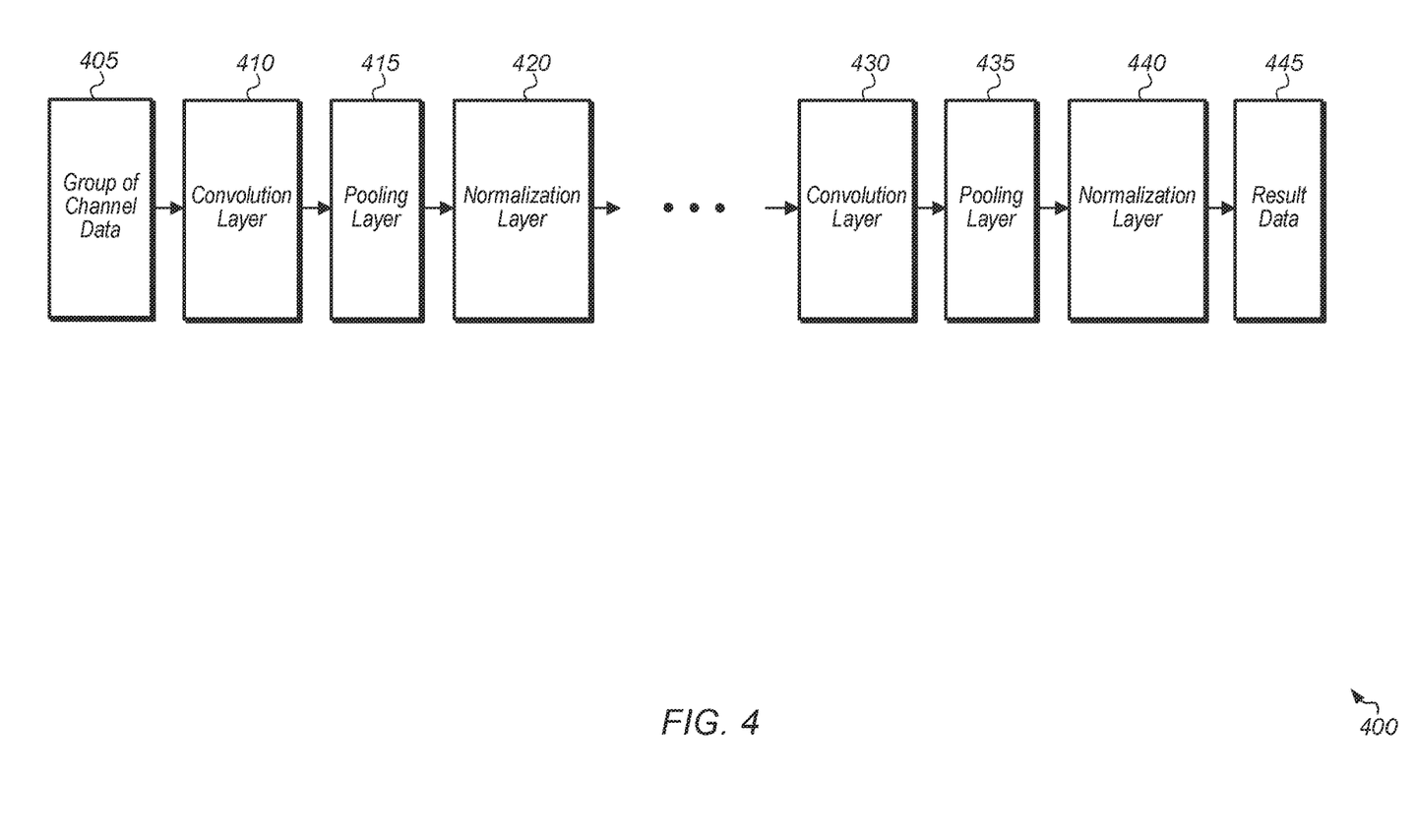
FIG. 4 is a block diagram of another implementation of a neural network.

Turning now to FIG. 4, a block diagram of another embodiment of a neural network 400 is shown. Neural network 400 illustrates another example of a neural network that can be implemented on a computing system (e.g., system 100 of FIG. 1, system 200 of FIG. 2). Neural network 400 includes at least convolution layer 410, pooling layer 415, normalization layer 420, convolution layer 430, pooling layer 435, normalization layer 440, and any number of other layers. Neural network 400 processes group of channel data 405 to generate result data 445. In one implementation, the group of channel data 405 is an image. In other implementations, the group of channel data 405 is any of various other types of input datasets.

During the execution of neural network 400, multiple tuning runs are executed to determine the improved operating parameters for each layer to have optimized performance. Then, during the subsequent operating of neural network 400, these improved operating parameters are used for the implementation of each layer. In one implementation, performance is optimized when execution time is minimized. In another implementation, performance is optimized when power consumption is minimized. In other implementations, other ways of defining what constitutes improved performance can be utilized. For example, improved performance may not be when any one parameter is minimized or maximized. Rather, it could be determined based on a combination of factors where some of the factors are not at a minimum or maximum. For example, improved performance may mean reducing power consumption as much as possible while a given level of performance is maintained. Alternatively, improved performance may be based in part on a given level of memory consumption or bandwidth. These and other embodiments are possible and are contemplated.

Figure 5:
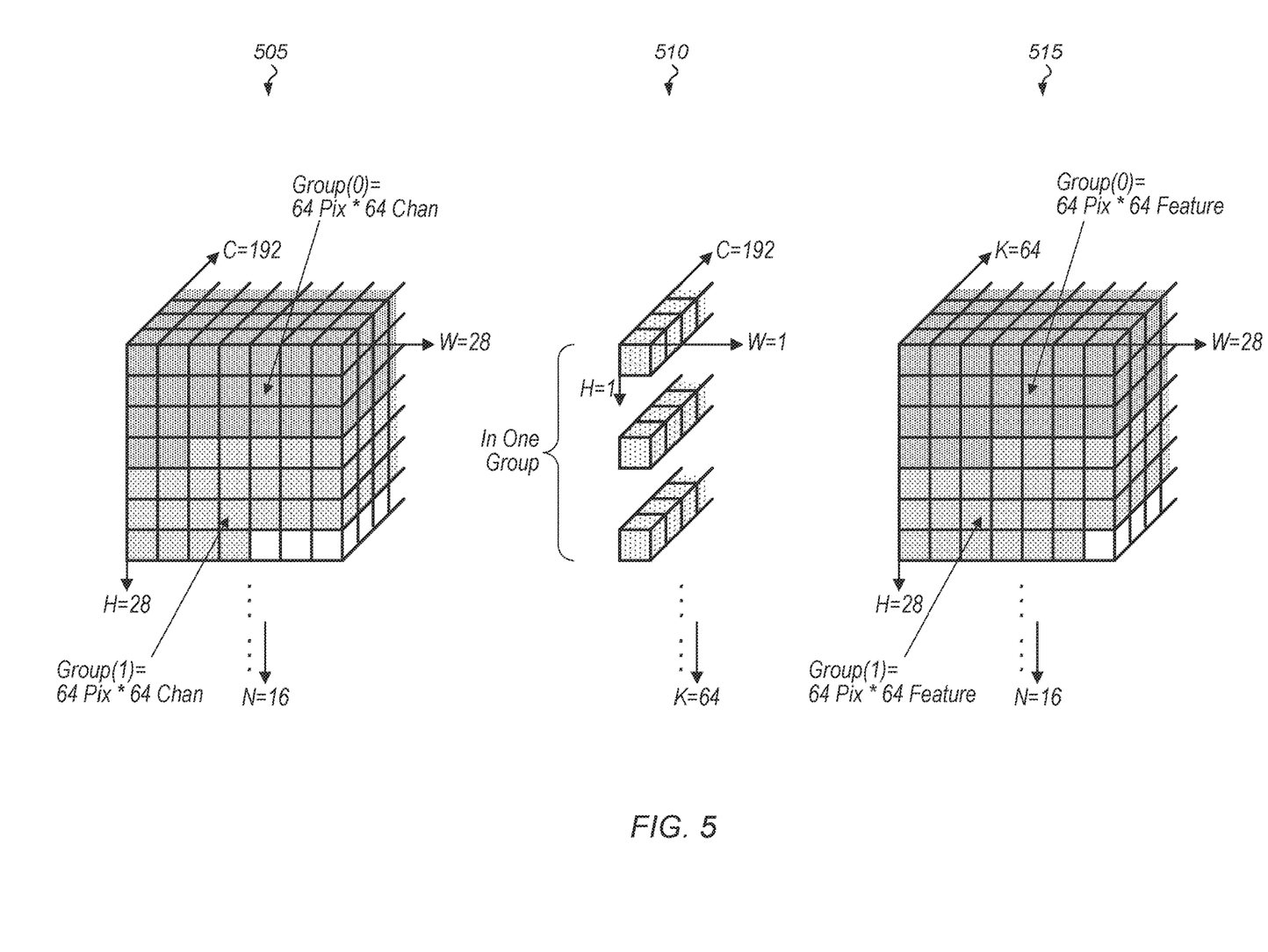
FIG. 5 is a block diagram of one implementation of an auto generation and tuning tool for convolution kernels.

Referring now to FIG. 5, a block diagram of one implementation of an auto generation and tuning tool for convolution kernels is shown. Input dataset 505 is represented by the three-dimensional (3D) arrangement of cubes on the left-side of FIG. 5. Dimensions C, H, W, and N in accordance with one implementation are shown for input dataset 505. In one implementation, input dataset 505 is an image. The dimension "C" is the number of input channels, "W" is the width of the image, "H" is the height of the image, and "N" is the number of batches of input data. In one implementation, C is equal to 192, W is equal to 28, H is equal to 28, and N is equal to 16. It should be understood that in other implementations, one or more of these dimensions can be equal to other values.

In one implementation, the processor varies one or more parameters for performing a convolution operation between input dataset 505 and weights 510 to generate output dataset 515. In one implementation, the processor varies the number of input data elements that are fetched in a single group from input dataset 505 and filtered by weights 510. For example, each group(0), group(1), and so on is processed in sequential fashion by the processor to generate output dataset 515. The number of input data elements that are fetched in a single group from input dataset 505 will determine how many loops are required to process the entirety of input dataset 505. The processor collects performance data for each program of a total number of programs that are executed, with each program using a different set of parameters. After executing the total number of iterations and collecting performance data, the processor determines which parameters result in a better performance for the current layer of the neural network. Then, the processor uses these parameters when executing this layer of the neural network on other input datasets. The processor repeats this process for other layers of the neural network. Accordingly, the processor determines which parameters result in a better performance for each layer of the neural network separately from other layers of the multi-layer neural network.

Figure 6:
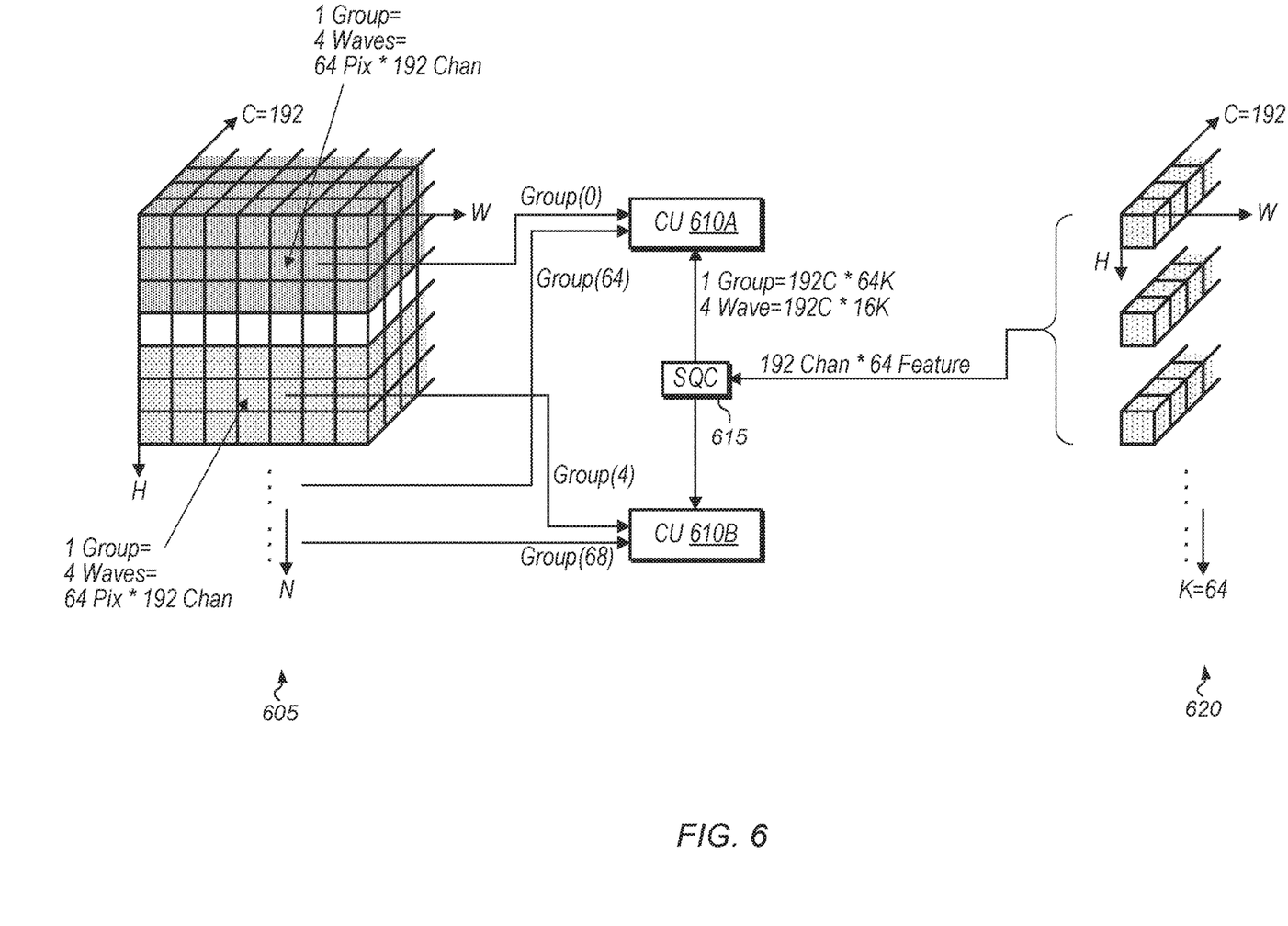
FIG. 6 is a block diagram of one implementation of the data path of an auto generation and tuning tool for convolution kernels.

Turning now to FIG. 6, a block diagram of one implementation of the data path of an auto generation and tuning tool for convolution kernels is shown. Input dataset 605 is represented as a 3D arrangement of cubes to depict the input channel data being processed by a given layer of a neural network. In one implementation, input dataset 605 is partitioned into a plurality of groups which are processed sequentially. In one implementation, the plurality of groups are processed by a plurality of compute units of a parallel processor (e.g., GPU). In one implementation, a convolution operation is implemented to process each group in a single loop within the compute units. The convolution operation is performed for each group of input dataset 605 and for a corresponding set of filter weights 620. In one implementation, the set of filter weights which are used to implement the convolution filter operation are loaded from memory into sequencer cache (SQC) 615, and the input dataset is loaded directly to the compute units through L1 cache 265. In one implementation, the filter weights are prefetched into SQC 615 before the convolution filter operation is performed so that lookups for the weights will hit in SQC 615 during execution of the convolution filter code. In one implementation, SQC 615 is shared between two compute units (CUs) 610A and 610B. In other implementations, SQC 615 is shared between other numbers of compute units. CUs 610A-B perform the convolution operations between the elements of group of input dataset 605 and the set of filter elements 620. After performing the convolution operation for a given group, CUs 610A-B load another group of input dataset 605 and another set of filter elements and repeat the convolution operation until all groups of input dataset 605 have been processed.

In one implementation, the processor executes a plurality of tuning runs of a convolution layer of a neural network on input dataset 605. Each tuning run uses a different size of a group for processing a portion of input dataset 605 in a single loop. As used herein, the term "loop" is defined as a group of instructions for processing a portion of an input dataset to generate output data in accordance with a specific type of operation. In one implementation, the specific type of operation is a convolution filter operation. The processor also optionally varies one or more other operating parameters during each tuning run. During each tuning run, the processor captures various performance metrics. After capturing performance metrics for the different sizes of groups, the processor determines which tuning run resulted in a better performance for the given layer. The group size and any other operating parameters from this tuning run are then utilized when processing subsequent datasets through the given layer of the neural network.

Figure 7:
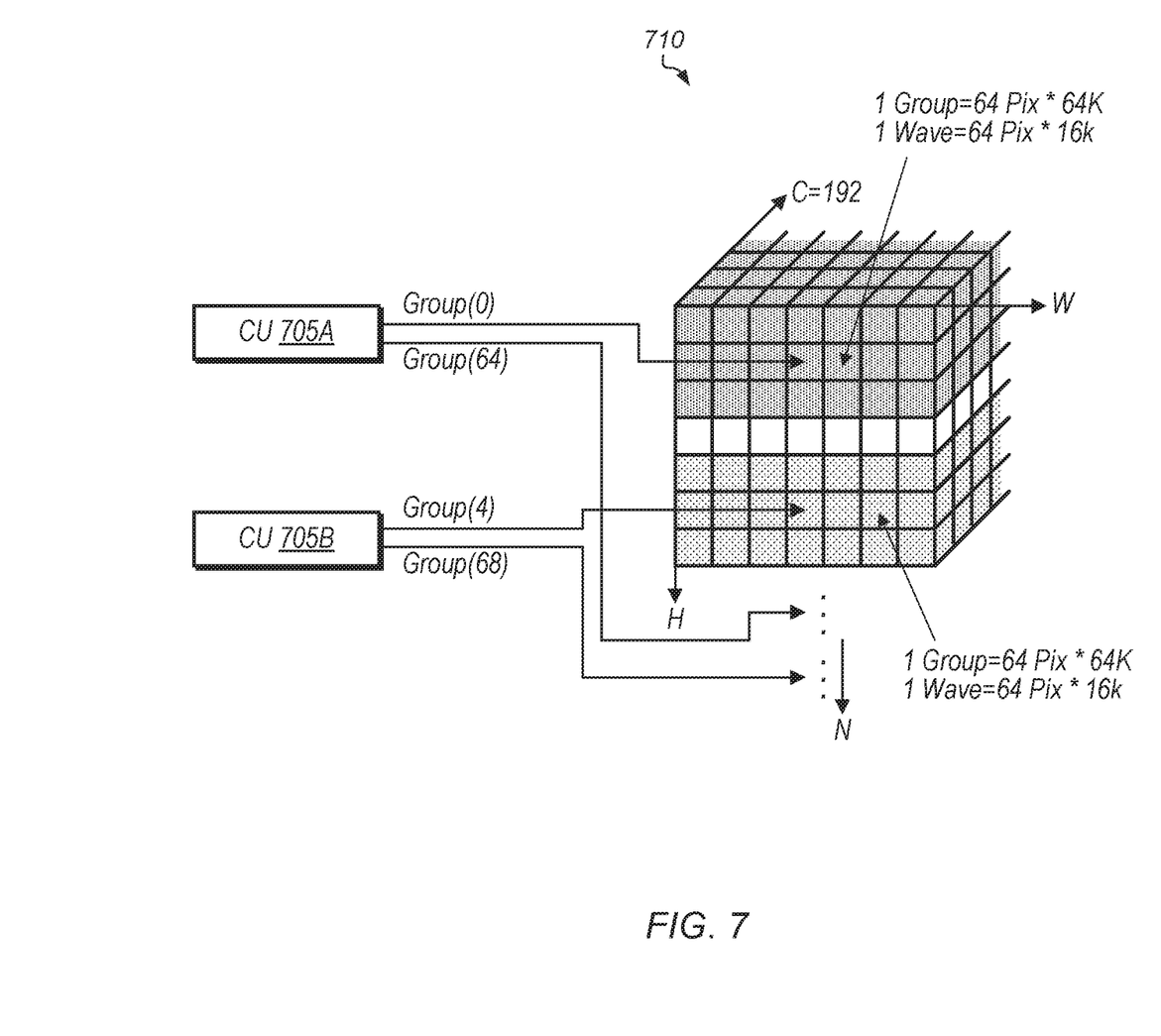
FIG. 7 is a block diagram of one implementation of the generation of an output dataset by compute units.

Referring now to FIG. 7, a block diagram of one implementation of the generation of an output dataset 710 by compute units 705A-B is shown. In one implementation, compute units 705A-B implements a given layer of a neural network by performing operations on an input dataset (not shown) and filter weights (not shown) a group at a time to generate output dataset 710. Depending on the implementation, the given layer is a convolution layer, a pooling layer, a normalization layer, or other type of layer. In one implementation, compute units 705A-B perform convolution operations on input dataset and filter weights to generate output dataset 710 a group at a time. It should be understood that while two compute units 705A-B are shown in FIG. 7, in other implementations, other numbers of compute units can be used to generate output dataset 710.

In one implementation, the group size of the input dataset that is processed by compute units 705A-B in a single loop is adjusted during different tuning runs. Compute units 705A-B capture performance data during these tuning runs. The group size that result in a better performance will be selected for subsequent iterations of the particular layer of the neural network. It should be understood that the dimensions of output dataset 710 and number of pixels and channels per group and wave can vary according to the layer, neural network, and specific implementation.

Figure 8:
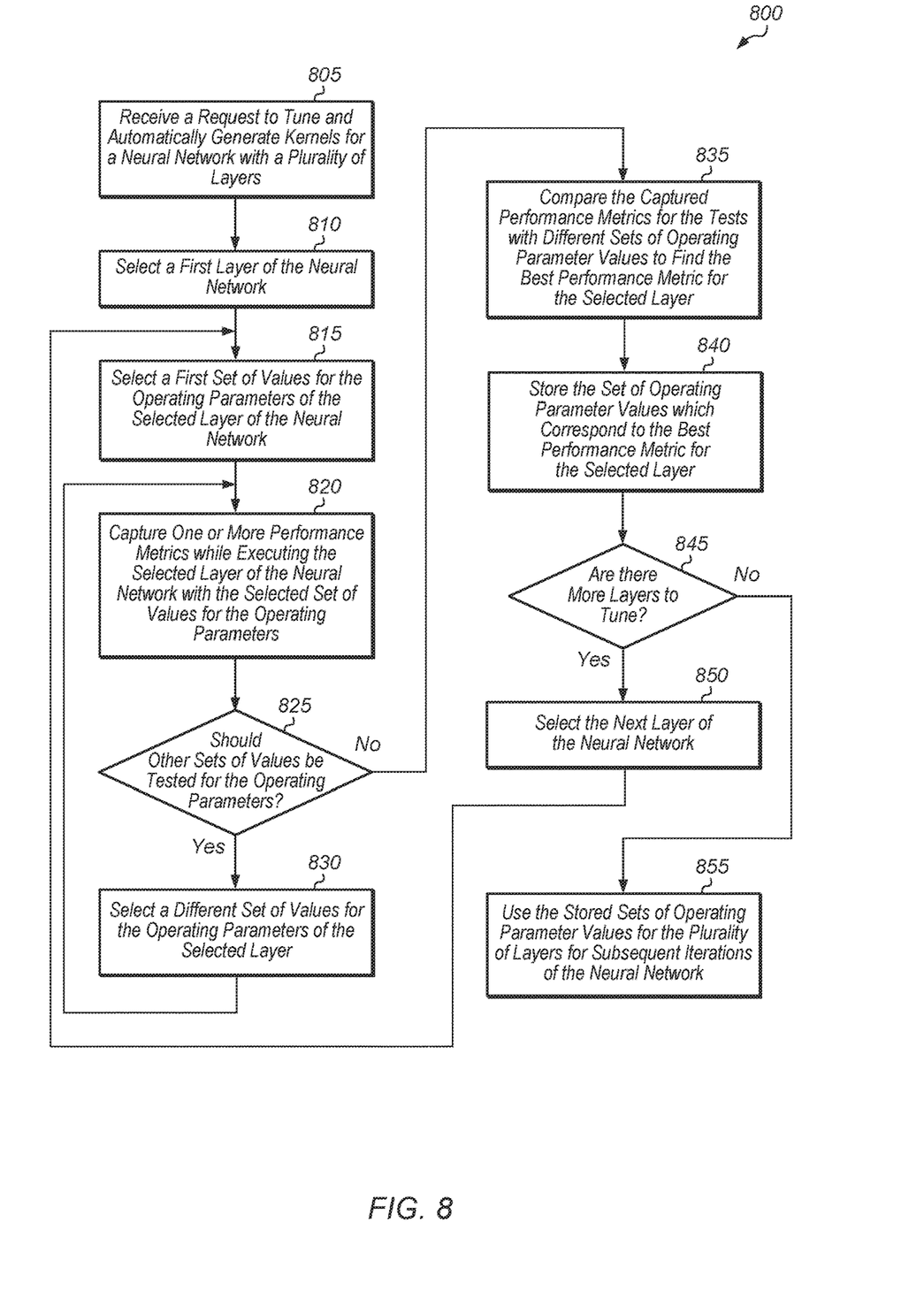
FIG. 8 is a generalized flow diagram illustrating one implementation of a method for implementing an auto generation and tuning tool for convolution kernels.
Figure 9:
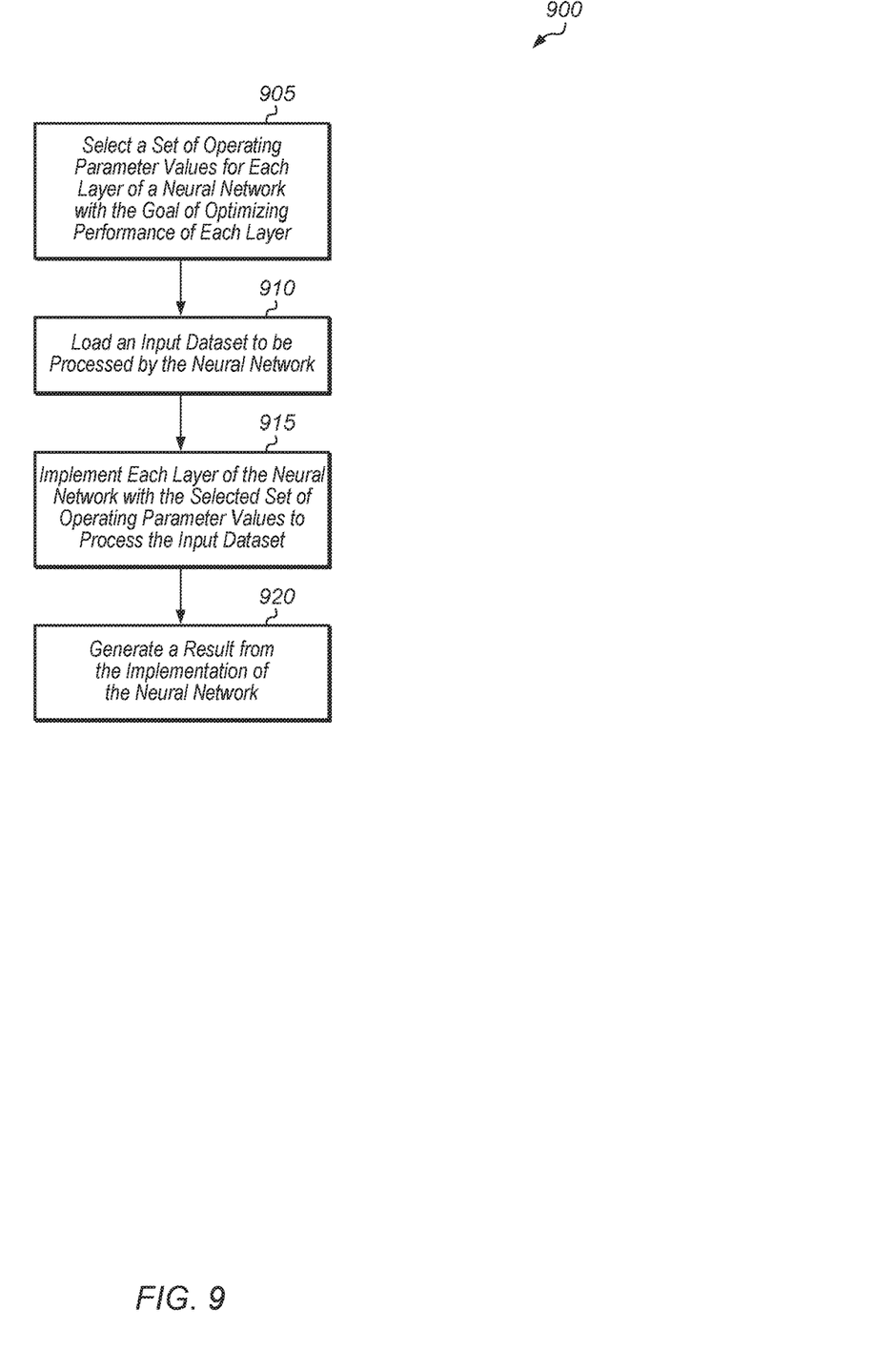
FIG. 9 is a generalized flow diagram illustrating one implementation of a method for auto-tuning kernels when implementing a neural network so as to optimize performance.

Turning now to FIG. 8, one implementation of a method 800 for implementing an auto generation and tuning tool for convolution kernels is shown. For purposes of discussion, the steps in this implementation those of FIG. 9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 800.

A processor (e.g., GPU) receives a request to tune a neural network with a plurality of layers (block 805). In response to receiving the request, the processor selects a first layer of the neural network (block 810). Then, the processor selects a first set of values for the operating parameters of the selected layer of the neural network (block 815). For example, in one implementation, the first set of values specify an amount of data that is fetched from global memory and/or cache at a time in each fetch and the number of output channels that are calculated in one loop. In other implementations, the first set of values specify values for other operating parameters (e.g., convolution kernel size) that determine how the processor performs the selected layer of the neural network.

Next, the processor captures one or more performance metrics while executing the selected layer of the neural network with the selected set of values for the operating parameters (block 820). Depending on the implementation, the one or more performance metrics include the execution time for the selected layer, the power consumed during execution of the selected layer, memory usage, memory bandwidth usage, register usage, and/or other metrics. In some implementations, the performance metrics that are utilized are user-configurable, selected by a software application, or programmable by other sources or based on various detected conditions.

Next, the processor determines if other sets of values for the operating parameters should be tested for the selected layer of the neural network (conditional block 825). For example, in one implementation, the processor tries N different sets of operating parameters for N different executions of the selected layer, where N is a positive integer greater than one. For example, in one implementation, N is equal to 100. In other implementations, N is equal to other values.

If the processor determines that other sets of operating parameters should be tested for the selected layer of the neural network (conditional block 825, "yes" leg), then the processor selects a different set of values for the operating parameters of the selected layer (block 830). After block 830, method 800 returns to block 820. If the processor determines that a sufficient number of sets of values for the operating parameters have already been tested for the selected layer of the neural network (conditional block 825, "no" leg), then the processor compares the captured performance metrics for the tests with the different sets of operating parameter values to find a better performance metric for the selected layer (block 835). In one implementation, the processor generates a performance score from multiple captured performance metrics that were captured and then compares the performance scores in block 835 for the different tests to find the highest performance score. For example, in one implementation, the performance score is generated by adding together each performance metric multiplied by a different weight. In this implementation, the performance score is equal to a first metric multiplied by a first percentage added to a second metric multiplied by a second percentage added to a third metric multiplied by a third percentage and so on. The values of the metrics can be normalized to some range that is consistent across all metrics. For example, in one implementation, each metric is converted to a value in the range from 0.0 to 1.0. It should be understood that other techniques for calculating a performance score are possible and are contemplated. Next, the processor stores the set of operating parameter values which corresponds to a better performance metric for the selected layer (block 840).

After block 840, the processor determines if there are more layers of the neural network to tune (conditional block 845). If there are more layers of the neural network to tune (conditional block 845, "yes" leg), then the processor selects the next layer of the neural network (block 850), and then method 800 returns to block 815. If there are no more layers of the neural network to tune (conditional block 845, "no" leg), then the processor uses the stored sets of operating parameter values for the plurality of layers for subsequent iterations of the neural network (block 855). After block 855, method 800 ends.

Referring now to FIG. 9, one implementation of a method 900 for auto-tuning kernels when implementing a neural network so as to optimize performance is shown. A processor selects a set of operating parameter values for each layer of a neural network with the goal of optimizing performance of each layer (block 905). In one implementation, the processor implements an auto generating and tuning tool for generating kernels as described in method 800 (of FIG. 8) to determine which set of operating parameter values to utilize for each layer of the neural network. It is noted that the definition of performance can vary from implementation to implementation. For example, in one implementation, performance is optimized when execution time is minimized. In another implementation, performance is optimized when power consumption is minimized. In other implementations, other ways of defining what constitutes improved performance can be utilized.

Next, the processor loads an input dataset (e.g., an image) to be processed by the neural network (block 910). It is noted that in some implementations, the processor loads the input dataset a portion at a time, with the size of the portion specified by one of the operating parameter values. Then, the processor implements each layer of the neural network with the selected set of operating parameter values to process the input dataset (block 915). Then, the processor generates a result from the implementation of the neural network (block 920). In one implementation, the result is data that identifies a classification ("classification data") of the input dataset into a given category out of a plurality of categories. For example, in one implementation, the input dataset is an image, and the classification identifies a given category to which the image belongs. The data that identifies the classification is then stored for use in further processing. In some embodiments, the classification data is used to modify or otherwise affect display data. For example, in some embodiments the classification data is used to identify an individual or object that appears in a video frame and some type of indication of this classification is then presented on the video display. In other embodiments, the classification data is used for further processing to determine how the identified person or object is treated for further processing. For example, if the classification data indicates the object is a car, then further processing may use this data to predict the location of the car in a later video frame. These and other embodiments are possible and are contemplated. In another implementation, the input dataset is a video, and the classification assigns the video to a given category. In other implementations, the input dataset includes other types of data. In other implementations, other types of results are generated. After block 920, method 900 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a processor comprising circuitry configured to:
execute a plurality of iterations of a given layer of a neural network, comprising a plurality of layers, to process a first dataset, wherein at least two iterations of the plurality of iterations of the given layer are executed prior to executing another layer of the neural network and each of the at least two iterations uses a different set of operating parameter values;
capture performance data during each of the at least two iterations; and
store one of the different set of operating parameter values that corresponds to an improved performance, during an iteration of the at least two iterations of the plurality of iterations, for use in future executions of the given layer; and
execute the given layer of the neural network with the one of the different set of operating parameter values that corresponds to the improved performance to process a second dataset.

2. The system as recited in claim 1, wherein the processor is configured to execute the plurality of iterations of the given layer prior to executing another layer of the neural network.

3. The system as recited in claim 1, wherein the processor is further configured to capture performance data corresponding to each of the plurality of iterations, wherein the performance data comprises one or more of execution time, power consumption, memory usage, memory bandwidth usage, and/or register usage.

4. The system as recited in claim 1, wherein the iteration of the plurality of iterations with a lowest execution time has the improved performance.

5. The system as recited in claim 1, wherein the processor is further configured to store the one of the different set of operating parameter values, responsive to the one of the different set of operating parameter values corresponding to the improved performance.

6. The system as recited in claim 1, wherein the processor is further configured to execute the given layer of the neural network with the different set of operating parameter values that corresponds to the improved performance to process a plurality of other datasets.

7. The system as recited in claim 1, wherein the different set of operating parameter values comprise one or more of an image size, a number of channels, a batch size, and a number of output feature maps.

8. A method comprising:
executing, by circuitry of a processor, a plurality of iterations of a given layer of a neural network comprising a plurality of layers to process a first dataset, wherein at least two iterations of the plurality of iterations of the given layer are executed prior to executing another layer of the neural network and each of the at least two iterations uses a different set of operating parameter values;

capturing performance data during each of the at least two iterations;

storing, by the processor, one of the different set of operating parameter values that corresponds to an improved performance, during the at least two iterations of the plurality of iterations, for use in future executions of the given layer; and executing the given layer of the neural network with the one of the different set of operating parameter values that corresponds to the improved performance to process a second dataset.

9. The method as recited in claim 8, further comprising executing the plurality of iterations of the given layer prior to executing another layer of the neural network.

10. The method as recited in claim 8, further comprising capturing performance data corresponding to each of the plurality of iterations wherein the performance data comprises one or more of execution time, power consumption, memory usage, memory bandwidth usage, and/or register usage.

11. The method as recited in claim 8, wherein the iteration of the plurality of iterations with a lowest execution time has the improved performance.

12. The method as recited in claim 8, further comprising:
for each layer of a plurality of layers of the neural network storing the one of the different set of operating parameter values, responsive to the one of the different set of operating parameter values corresponding to the improved performance.

13. The method as recited in claim 8, further comprising executing the given layer of the neural network with the different set of operating parameter values that corresponds to the improved performance to process a plurality of other datasets.

14. The method as recited in claim 8, wherein the different set of operating parameter values comprise one or more of an image size, a number of channels, a batch size, and a number of output feature maps.

15. An apparatus comprising:
a memory storing a first dataset and a second dataset; and
a plurality of compute units coupled to the memory, wherein the plurality of compute units are configured to:
execute a plurality of iterations of a given layer of a neural network comprising a plurality of layers to process a first dataset, wherein at least two iterations of the plurality of iterations of the given layer are executed prior to executing another layer of the neural network and each of the at least two iterations uses a different set of operating parameter values;
capture performance data during each of the at least two iterations; and
store one of the different set of operating parameter values that corresponds to an improved performance, during an iteration of the at least two iterations of the plurality of iterations, for use in future executions of the given layer; and
execute the given layer of the neural network with the one of the different set of operating parameter values that corresponds to the improved performance to process a second dataset.

16. The apparatus as recited in claim 15, wherein said iterations correspond to a layer tuning process, and the plurality of compute units are configured to perform the layer tuning process on at least on other layer of the neural network.

17. The apparatus as recited in claim 15, wherein the apparatus is further configured to capture performance data corresponding to each of the plurality of iterations, wherein the performance data comprises one or more of execution time, power consumption, memory usage, memory bandwidth usage, and/or register usage.

18. The apparatus as recited in claim 15, wherein the operating parameter values comprise one or more of an image size, a number of channels, a batch size, and a number of output feature maps.

19. The apparatus as recited in claim 15, wherein the one of the different set of operating parameter values is stored responsive to the one of the different set of operating parameter values corresponding to the improved performance.

20. The apparatus as recited in claim 15, wherein the first and second datasets are images.

* * * * *